United States Patent

Marshall

[15] 3,653,468
[45] Apr. 4, 1972

[54] EXPENDABLE SHOCK ABSORBER

[72] Inventor: Gailen D. Marshall, P.O. Box 85, Sugar Land, Tex. 77478

[22] Filed: May 21, 1970

[21] Appl. No.: 39,491

[52] U.S. Cl. ..............................................188/1 C, 73/151
[51] Int. Cl. .........................................................F16f 7/12
[58] Field of Search ...................73/151; 188/1 C; 244/138 R

[56] References Cited

UNITED STATES PATENTS

| | | | |
|---|---|---|---|
| 2,401,748 | 6/1946 | Dillon | 188/1 C UX |
| 2,577,599 | 12/1951 | Bethancourt | 73/151 |
| 3,096,268 | 7/1963 | Lindsay et al. | 188/1 C |
| 3,305,452 | 2/1967 | Remoleur | 188/1 C X |
| 3,493,082 | 2/1970 | Bell | 188/1 C |

FOREIGN PATENTS OR APPLICATIONS

| | | | |
|---|---|---|---|
| 1,105,404 | 6/1955 | France | 188/1 C |

*Primary Examiner*—Duane A. Reger
*Attorney*—George L. Church, Donald R. Johnson, Wilmer E. McCorquodale, Jr. and John E. Holder

[57] ABSTRACT

An expendable shock absorber especially adaptable for use with wellbore instruments being go-deviled into the wellbore. The shock absorber has washer-like projections extending from a hollow cylinder. A cutter bar which can slide over the hollow cylinder engages the washer-like projections and upon impact of the survey tool, the shock is expended by the cutter bar shearing off the washer-like projections.

9 Claims, 2 Drawing Figures

INVENTOR
GAILEN D. MARSHALL

ATTORNEY

EXPENDABLE SHOCK ABSORBER

BACKGROUND OF THE INVENTION

This invention relates to a new and improved shock absorber for borehole tools which lessens primary impact and diminishes or eliminates recoil.

Currently there are several borehole survey tools which can be go-deviled into a wellbore to record the inclination and direction of the borehole at one or several locations. The go-deviling operation in the case of a wellbore ordinarily consists of letting a survey tool fall through the mud column to the bottom of the wellbore. Because rig time is usually very expensive, this process is often speeded up by pumping the survey tool to the bottom of the wellbore. Thus, the survey tool often reaches the bottom of the wellbore at velocities in excess of 30 mph.

Since these survey tools contain apparatus for taking pictures of compasses and/or angle units, a power source, and other fragile equipment, it is evident that some form of shock absorber is required. In addition to the equipment recited above, other problems have arisen because of deep and very high temperature holes which are being more and more frequently encountered. Since heat can be destructive to both the batteries and the film in a survey tool, when the survey instruments are run into hot holes come thermal protection is required. This thermal protection may be of a frangible nature such that heavy shock forces would render it inoperable.

The most common shock absorber now being employed with survey tools involves a heavy bottom shock which is a massive spring located near the bottom of the survey tool. A smaller spring is used inside the tool to support the survey instruments and absorb the initial shock and recoil which would be transmitted to the survey equipment. Garlock rings are also used which are cup-shaped washers which form an air seal with the inside of the protective case. Air is trapped between the garlock rings and upon inpact, the garlock rings act to compress the column of air therebetween. Accordingly, the garlock rings offer a resistance which increases as the garlock rings move downward with impact, since the air pressure increases as the volume between the rings decreases. Given sufficient length for the garlock rings to operate in, it is a very effective way to absorb the shock and eliminate the recoil. However, because of the necessity for limiting the length of the survey tool due to crooked holes or directionally drilled holes, another method of absorbing the shock utilizing less length is desired. Another reason for shortening the length of the survey instrument relates to the cost and limited supply of nonmagnetic materials such as MONEL. Nonmagnetic material is necessary for use in wellbore survey tools using compasses therein. It is therefore an object of the present invention to provide a new and improved apparatus for absorbing shock.

SUMMARY OF THE INVENTION

With this and other objects in view, the present invention contemplates using an expendable shock absorber which effectively reduces the initial shock and substantially eliminates the recoil in the dropping of a tool into a borehole. The shock absorber consists of a cylinder having washer-like projections extending from the cylinder and at substantially right angles thereto. A cutting bar slides over the hollow cylinder so that it engages one of the washer-like projections. Upon impact of the tool with the bottom of the borehole, the shock created by the downward force of the tool is expended in the energy required by the cutting bar shearing off the washer-like projections from the cylinder.

In one configuration, a cylinder with related washer-like projections and a cutting bar is located near the bottom of a tool and another is located inside the housing of the tool, and supports the survey instruments. The shock absorber located inside the housing of the tool dissipates the shock of initial impact and recoil which is transferred to the tool by expending the energy required to shear the washer-like projections from the cylinder located in the tool housing with its related cutter bar. The washer-like projections may be gradiated in thickness such that a heavy shock transmitted to the cutter bar would encounter washers more and more difficult to shear from the cylinders.

The expendable shock absorbers described may be used in conjunction with conventional shock absorbers now being employed which would operate as a back-up if the shock absorbers described herein go solid, i.e.; all the washer-like projections are sheared from the cylinder. Thus, if the cutter bar shears off the final washer-like projection, a spring would be engaged such as those now being employed in borehole tools.

A complete understanding of this invention may be had by reference to the following detailed description, when read in conjunction with the accompanying drawings.

DESCRIPTION OF THE PREFERRED EMBODIMENTS

Figures 1, 2:
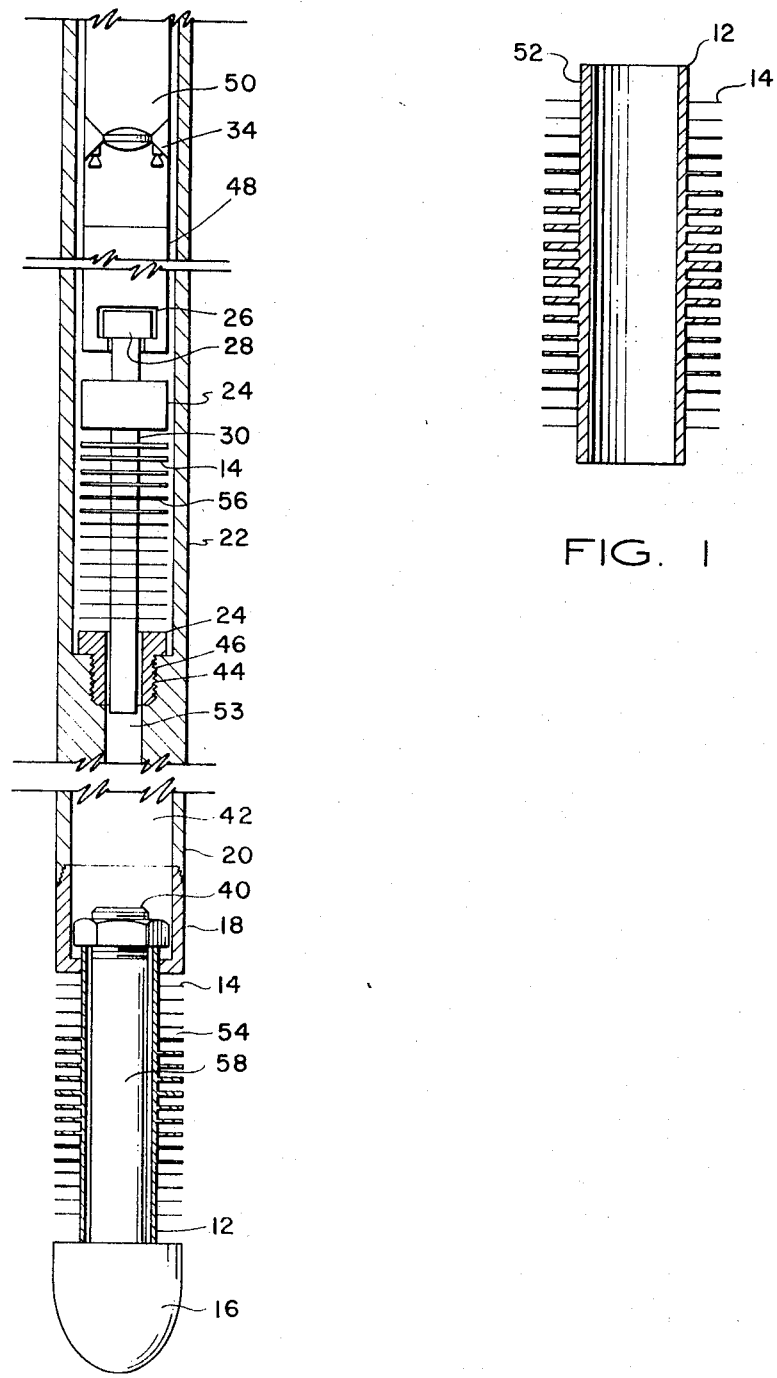
FIG. 1 is a cross section of a hollow cylinder with washer-like projections.
FIG. 2 is a cross section of a portion of a wellbore survey tool employing the expendable shock absorber illustrated in FIG. 1.

Referring first to Fig. 1 of the drawings, an expendable shock is shown especially adaptable as the lower shock absorber for wellbore survey tools. This member comprises basically a cylindrical portion 12, with washer-like projections 14 extending from the cylinder 12 substantially at right angles thereto. The washer-like projections 14 extend completely around the hollow cylinder 12 and increase in thickness going from the ends toward the middle of the hollow cylinder. Short spaces are left free of such washer-like projections 14 at each end of the hollow cylinder 12 for fitting the shock absorber to adjacent portions of the survey tool. The expendable shock is easily machined from a section of bar stock by boring out the center portion and making a series of cuts at right angles to the bore direction. As machined, the expendable shock absorber consists of a single metallic member resembling a hollow cylinder with washers fitted over the cylinder and spaced along its length. In actuality, however, the washer-like projections 14 are attached to the cylinder 12. This shock absorber is preferably made of a strong, inexpensive and easily machined material such as aluminum.

The expendable shock absorber 52 of FIG. 1 is further shown in FIG. 2 which illustrates portions of a wellbore survey tool. Located at the lower end of the wellbore survey tool is a plug 16 having a shaft 58 extending upwardly therefrom. The lower shock absorber 54 is mounted upon the shaft 58. A cutter bar 18 slides over the top of hollow cylinder 12. The cutter bar 18 is in contact with washer-like projection 14. Connector nut 40 is threadedly attached to shaft 58 and acts as a flange which engages the lower portion of the cutter bar 18. The cutter bar 18 is threadedly attached to extension bar 20. The portion of the tool between the lower shock absorber 54 and the instrument shock absorber 56 has not been illustrated.

The instrument shock absorber 56 consists of a solid cylindrical rod 30 having washer-like projections 14 encircling said solid cylindrical rod 30, an instrument cutter bar 24, and a slot engagement member 28. The instrument cutter bar 24 is located at the lower end of the instrument shock 56 and is connected with a threaded plug 44 which is screwed into recess 46. Threaded plug 44 has a bore therethrough which connects with a channel 53. The bore of threaded plug 44 and channel 53 are for the purpose of receiving solid cylindrical rod 30. Mounted above the instrument shock absorber 56 is an insulator section 48. The insulator section 48 protects the survey instruments from excessive heat. The connection between the instrument shock absorber 56 and the insulator section 48 is accomplished by fitting slot engagement member 28 into slot 26. The insulator section 48 connects with the instrument section 50, but such connection is not shown in the drawing. The instrument section 50 houses various instruments such as lens and lamp holder 34. The remainder of the wellbore survey tool above the portion of the instrument section 50 illustrated herein has not been shown.

In the operation of the wellbore survey tool, the tool is go-deviled into the wellbore such that upon reaching bottom, the bottom plug 16 contacts with significant force the bottom of the wellbore or apparatus located near the bottom of the wellbore. The weight of the wellbore tool then acts through cutter bar 18 to provide a force against the washer-like projections 14. This force causes the cutter bar 18 to shear the washer-like projections 14 from attachment with the hollow cylinder 12.

As depicted, when successive washer-like projections 14 are sheared from hollow cylinder 12, increased resistance is met because of the increasing thickness of the washer-like projections 14. If the lower shock absorber 54 goes solid, i.e., all the washer-like projections 14 are sheared from the hollow cylinder 12, a severe recoil might well occur, if all of the shock has not been absorbed at that time. In order to protect the instruments further, instrument section 50 rides on instrument shock absorber 56.

The instrument shock absorber 56 operates in the same manner as lower shock absorber 54 in that the weight of the instrument section 50 exerts a force on instrument cutter bar 24 which acts to shear washer-like projections 14 from the solid cylindrical rod 30, thereby absorbing the shock of impact by expending the energy in shearing the washer-like projections 14 from attachment with the rod 30. As the washer-like projections are sheared, the solid cylindrical rod 30 travels into channel 53 through the bore of plug 44.

As the lower shock absorber 54 is depicted herein, when the wellbore survey tool is retrieved, the shock absorber can be reused by simply turning over the hollow cylinder so that the washer-like projections 14 which have not been sheared will be in contact with the cutter bar 18. As will be noted by examination of FIG. 2, the lower shock absorber washer-like projections become thicker toward the mid-point of the hollow cylinder. As instrument shock absorber 56 is depicted, the shock absorber would probably not be reused because of the thickness of the washer-like projections 14 located at the bottom portion of the shock absorber 56. There the washer-like projections gradually become thicker going from the bottom to the top. It is contemplated that various sizes of shock absorbers could be utilized as well as varying thicknesses of the washer-like projections. Other configurations utilizing a shearing action for absorbing shock is also contemplated. As depicted, there is little chance that debris caused by the shock absorbers would be ejected into the wellbore. The washer-like projections 14 upon being sheared from the cylinders 12 and 30 remain on the cylinders 12 and 30 since they extend completely around said cylinders.

The chart shown below summarizes tests showing a comparison between conventional spring shock absorbers and the expendable shock absorbers which are the subject of this application. The measuring device for determining primary impact and recoil impact involves a member having cone shaped ends and a related impact shield adjacent each end. When impact occurs, the member having cone shaped ends strikes the shield making a dent therein. If recoil occurs, a similar indentation is made on the other impact shield. The diameter of the base of the cone shaped indentation is measured which gives an indication of the force transmitted to the impact shield, thus a higher diameter indicates a higher impact.

An inspection of the above chart reveals a substantial reduction of shock which would be transmitted to the wellbore survey tool when the expendable shock absorber is used. It is also obvious from this chart that the use of expendable shocks for both the lower shock absorber and instrument shock absorber would greatly reduce the primary impact and recoil impact transmitted to the wellbore survey tool. It is readily seen that the invention disclosed herein may have application to other devices which are go-deviled into wellbores. The expendable shock absorbers described herein may also be used in combination with other shock absorber devices, either operating in series or simultaneously.

While particular embodiments of the present invention have been shown and described, it is apparent that changes and modifications may be made without departing from this invention in its broader aspects. The aim in the appended claims is to cover all such changes and modifications as fall within the true spirit and scope of this invention.

What is claimed is:

1. A shock absorber system for use with wellbore tools having an instruments package where the tools are go-deviled into a borehole comprising: an elongated solid member having annular surfaces projecting therefrom and spaced along the length of said member where the solid member supports the instruments package; cutter means arranged to transfer the force of impact transmitted to the instruments package to said annular surfaces; and shock absorber means located at the lower end of the tool for absorbing the majority of the shock caused by the tools impact with the bottom of the hole.

2. The shock absorber of claim 1 wherein the cutter means is a hollow member arranged to slide over said elongated solid member and having a leading edge in contact with one of the annular surfaces.

3. An expendable shock absorber protecting an instruments package in the housing of a wellbore tool comprising: an elongated solid member supporting the instruments package having annular washer-like projections spaced along the length of said solid member; and a hollow member having an internal diameter greater than the external diameter of said solid member, wherein said hollow member also has a leading edge in contact with one of the washer-like projections and a trailing edge communicating with the mass of said housing.

| Run number | Primary impact (inches) | Recoil impact (inches) | Type of shock absorber used | | Remarks |
|---|---|---|---|---|---|
| | | | Lower shock absorber | Instrument shock absorber | |
| 1 | 0.180 | 0.089 | Conventional spring | Conventional spring | Recoil half as strong as primary impact. |
| 2 | 0.091 | 0.051 | Expendable shock, 10 washers sheared. | do | Expendable shock broke due to clearance of cutter bar. However, primary impact was half that of Run number 1. Recoil was also half of primary as in Run number 1. |
| 3 | 0.103 | 0.028 | Expendable shock, 13 washers sheared. | do | Clearance modified to correct defect in Run number 2. |
| 4 | 0.052 | 0.010 | Expendable shock, 16 washers sheared. | None | Primary impact substantially reduced. |
| 5 | 0.095 | 0.000 | Conventional spring | Expendable shock, 11 washers sheared. | Used 5/16" diameter rod. |
| 6 | 0.070 | 0.000 | do | Expendable shock, 24 washers sheared. | Used 1/4" diameter rod. |

4. In a wellbore survey tool having a housing and survey instruments encased in said housing, a first shock absorber at the lower end of said housing for absorbing shock transmitted to the housing and survey instruments encasement, including shock resulting from dropping the tool to the lower end of a borehole, and a second shock absorber connected with the survey instruments encasement, said second shock absorber including: an elongated member having washer-like projections arranged along the length of said member; and means for shearing said washer-like projections from said hollow member in response to shock transmitted to the survey instruments encasement.

5. The apparatus of claim 4 wherein the washer-like projections become progressively thicker going from the end nearest the shearing means to the end adjacent the survey instruments.

6. The apparatus of claim 4 wherein the shearing means encircles said elongated member said shearing means being in contact with one of said washer-like projections.

7. In a wellbore tool having a housing and instruments encased in said housing, a shock absorber system for absorbing shock transmitted to the tool including shock resulting from dropping the tool to the lower end of a wellbore, said shock absorber system comprising: a first shock absorber including a shaft extending below the housing which terminates in a bulbous member; an elongated hollow member encircling a portion of the shaft, said hollow member having washer-like projections arranged along the length of said hollow member; means for shearing said washer-like projections from said hollow member in response to shock transmitted to the tool housing; and a second shock absorber for mounting said instruments wherein said second shock absorber includes an elongated member having washer-like projections arranged along the length of said elongated member and cutting means for shearing said washer-like projections from attachment with the elongated member in response to shock transmitted to the instruments.

8. A borehole tool having a housing, an instrument section in said housing and means for absorbing shocks transmitted to the housing and instrument section which result from dropping the tool to the lower end of the bore, which means comprises: a first shaft extending from and arranged for telescopic reception within said housing; means on the lower end of said first shaft for contacting the lower end of the bore; a sleeve encircling and in slidable contact with said first shaft and arranged for telescopic reception within said housing; a first plurality of annular members extending outwardly from said sleeve; an attachment between said first annular members and said sleever; means on said housing for contacting said first annular members and shearing the attachment between said first annular members and said sleeve when shock forces are applied to said contacting means; a second shaft movably positioned within said housing and attached to said instrument section; a second plurality of annular members extending from said second shaft, an attachment between said second annular members and said second shaft; and means on said housing for contacting said second annular members and shearing the attachment between said second annular members and said second shaft when shock forces are applied to said housing.

9. The method of absorbing shock in a wellbore tool housing an instruments section being go-deviled into a wellbore comprising; providing a first plurality of annular members attached to a shaft at the lower end of the tool housing; transferring the shock of sudden deceleration of the wellbore tool successively to the annular members; absorbing the force of deceleration by successively shearing the first annular members from the shaft to which the annular members are attached; providing a second plurality of annular members attached to a second shaft which supports the instruments section; absorbing any shock of sudden deceleration, not absorbed by shearing of the first annular members, by successively shearing the second annular members from the second shaft.

* * * * *

UNITED STATES PATENT OFFICE
CERTIFICATE OF CORRECTION

Patent No. 3,653,468           Dated April 4, 1972

Inventor(s) Gailen D. Marshall

It is certified that error appears in the above-identified patent and that said Letters Patent are hereby corrected as shown below:

On the cover sheet, insert -- [73] Assignee: Sperry-Sun Well Surveying Company --.

Signed and sealed this 7th day of November 1972.

(SEAL)
Attest:

EDWARD M. FLETCHER, JR.　　　　　　　　ROBERT GOTTSCHALK
Attesting Officer　　　　　　　　　　　　Commissioner of Patents